Dec. 18, 1951     C. A. LANG     2,579,326

SHORTENING CUTTER

Filed Jan. 10, 1949     4 Sheets-Sheet 1

INVENTOR.
CHARLES A. LANG
BY
*Paul, Paul & Moore*
ATTORNEYS

Dec. 18, 1951   C. A. LANG   2,579,326
SHORTENING CUTTER
Filed Jan. 10, 1949   4 Sheets-Sheet 3

INVENTOR.
CHARLES A. LANG
BY Paul, Paul & Moore
ATTORNEYS

Dec. 18, 1951  C. A. LANG  2,579,326
SHORTENING CUTTER
Filed Jan. 10, 1949  4 Sheets-Sheet 4
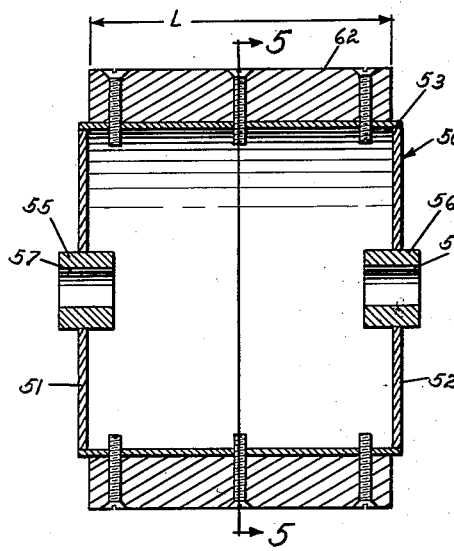
Fig. 4
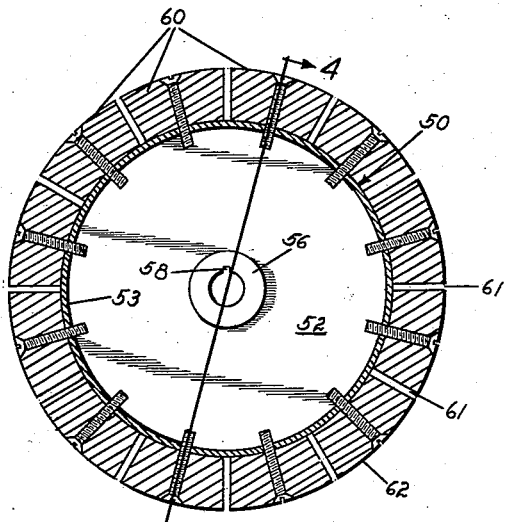
Fig. 5
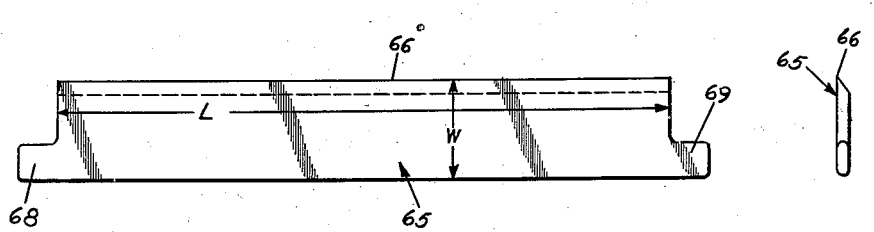
Fig. 6
Fig. 7
INVENTOR.
CHARLES A. LANG
BY Paul, Paul & Moore
ATTORNEYS Patented Dec. 18, 1951

2,579,326

UNITED STATES PATENT OFFICE 2,579,326

SHORTENING CUTTER

Charles A. Lang, Minneapolis, Minn., assignor to Russell-Miller Milling Co., Minneapolis, Minn., a corporation of Delaware Application January 10, 1949, Serial No. 70,017

4 Claims. (Cl. 146—91)

This invention relates to devices for rapidly reducing large masses of solid plastic shortening into small portions, preparatory to incorporating the shortening with flour, sugar, leavening agents, salt and other ingredients in the commercial production of prepared baking mixtures, such as biscuit mixtures, pie dough mixtures, cake mixtures and other ready prepared "packaged mixes." The preparation of such mixtures on a commercial basis is done in large batches, ranging from 1000 to 2000 pounds per batch. In a batch of 1500 pounds it is not infrequent that the total amount of shortening used in the batch may range as high as 500 to 600 pounds. For best results in the preparation of such commercial "packaged mixes" it is necessary to use solid type shortenings, rather than liquid shortenings. Some attempts have been made to provide shortening "blends" in which the shortening is already incorporated in sugar, powdered milk and the like solid ingredients so as to facilitate incorporation of the shortening into the dry ingredients of the "prepared mix." However, it has been found that superior results are to be obtained only by the use of solid types of shortening which are incorporated with the flour and other ingredients of the prepared mix during the manufacturing operation.

The problem involved with the use of a solid plastic material is that of uniformly distributing the shortening throughout the flour without raising the temperature of the batch during the mixing operation and without coating over the flour particles with shortening. Where the mixing operation is carried out for too long a time, the shortening material tends to become melted and to coat over the flour, sugar and other ingredients, and produces a gummy mass that does not readily accept water when the mixture is used, and very poor baking results are obtained when this occurs. Accordingly, in the factory preparation of such prepared mixes it is necessary to accomplish the entire mixing operation and to provide a uniform distribution of the solid "plastic" shortening throughout the flour and other dry ingredients of the mixture within a predetermined time of mixing operation, all without elevating the temperature of the batch above a predetermined maximum.

The shortening used for the preparation of such factory mixed prepared and ready-to-use packaged mixtures is usualy obtained in relatively large masses, approximately one cubic foot size, weighing upward to 50 pounds each. In early factory preparation of such ready-to-use baking mixtures it was customary to dump the entire large masses or blocks of solid shortening directly into a mixing apparatus along with the flour, sugar, salt, leavening agent and other dry ingredients of the mixture.

It was at first believed that it would be possible to incorporate the shortening by introducing such large size (50 pound or larger) blocks of shortening directly into the mixer along with the dry ingredients of the batch. After considerable experience had been gained with such factory operations, it was found, however, that the shortening could not be incorporated directly into the dry ingredients of the mixture when utilizing such large size blocks of plastic (solid) shortening for when this was done the finished mixture, after being mixed, would still contain relatively large chunks and particles of shortening which were not incorporated at all into the mixture. Thus, in some instances 15 to 20% of the shortening remained in the finished batch in discrete chunks and particles ranging in size from one ounce to several pounds and even larger on occasion. These discrete particles of unincorporated shortening, which had not been cut into the dry ingredients of the finished mxture had to be sifted out. The amount of unincorporated shortening varied greatly from batch to batch and as a result the operator preparing the mixture was never certain of the amount of shortening actually incorporated into the dry ingredients. The operator had to try to compensate for the amount of unincorporated shortening by adding an excess of shortening to the batch at the beginning of the operation and yet frequently the amount of shortening would be either too much or too little in the finished batch. The foregoing factors have made the results sufficiently irregular so as appreciably to influence the uniformity of the product, to say nothing of the added costs involved due to the extra steps.

Efforts were made to reduce the amount of this unincorporated shortening in the batch by extending the time of mixing but this was found to produce inferior results, because as the mixing time was increased poor baking results were obtained from the finished baking mixture. It is believed that these poor baking results occur due to the fact that during the factory preparation of the baking mixture the shortening becomes somewhat warmer and more fluid in its characteristics as the batch is worked for an extended period and it is believed that as a result of this greater fluidity, the shortening is spread or smeared over the flour particles in the manner of a coating and that this fact caused poor baking results. This belief is based upon observation and theory and seems to be reasonably well supported. Whatever may be the true reason for the poor baking results, it is known that when the period of factory mixing of the shortening and dry ingredients is extended beyond certain prescribed time limits, the resultant prepared mix becomes somewhat gummy and in the terms of factory parlance "breaks down" and such resultant mixtures do not readily accept water when thereafter used during baking operations, and when baked out in the final operation utilizing the prepared material, the baking results are decidedly inferior.

It is an object of the present invention to provide a machine for quickly reducing large masses of plastic shortening to relatively small particle size, and for depositing the same directly into the mixing apparatus containing flour, sugar, salt, leavening agent and other ingredients of the batch, wherein the relatively small masses of shortening are quickly and uniformly distributed and cut into the dry ingredients.

It is another object of the invention to provide a large capacity machine for quickly reducing large plastic masses into relatively small particle size.

It is also an object of the invention to provide a machine capable of quickly reducing large masses of sticky plastic materials and particularly solid shortening into relatively small particle size of shortening.

It is another object of the invention to provide a convenient shortening reducer capable of straight-through operation wherein the large plastic masses of shortening are inserted at the top and in passing through the machine are reduced to relatively small particle sizes of the shortening which are directly and quickly discharged out of the bottom of the machine for convenient delivery to a mixing apparatus positioned therebelow.

Other and further objects of the invention are those inherent in the apparatus herein illustrated, described and claimed.

The invention is illustrated with reference to the drawings in which corresponding numerals refer to the same parts and in which Figure 1 is a vertical sectional view along the section line and taken in the direction of arrows 1—1 of Figure 3;

Figure 4 is a vertical sectional view of the rotating drum member of the apparatus shown separated from the machine, said view being taken along the line and in the direction of arrows 4—4 of Figure 5;

Figure 5 is a transverse sectional view through the rotating drum of the apparatus taken along the line and in the direction of arrows 5—5 of Figure 4;

Figure 6 is a vertical elevational view of one of the cutting knives used in the rotating drum of the apparatus shown separated from the remaining portions of the structure;

Figure 7 is an end elevational view of the knife shown in Figure 6;

Figure 3:
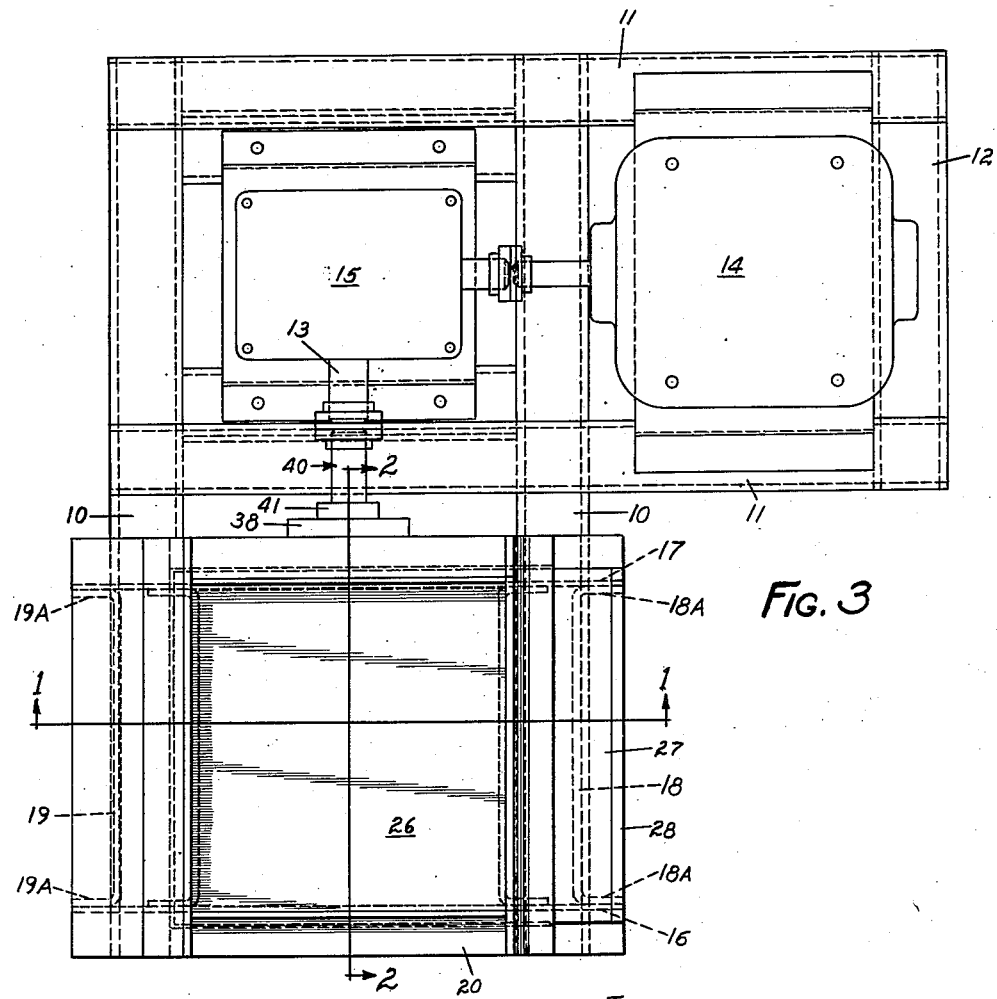
Figure 3 is a plan view of the apparatus.

The apparatus includes a pair of base frame channels 10—10 (Figure 1) which extend parallel to each other as illustrated in Figure 3, forming a frame of generally rectangular plan. Across the frame members 10—10 there are positioned a pair of parallel frame members 11—11, which extend to one side and are joined at the outer ends by the cross frame member 12. Suitable connection is made between the members 10—10 and members 11—11, thus providing a rugged frame on which the motor unit 14 is mounted. The motor is connected to a gear reducing unit 15, from which the shaft 13 extends at right angles to the motor shaft. The gear reduction in the unit 15 is such that the shaft 40 rotates at a rate of about 55 to 58 R. P. M.

Upon the frame members 10—10 there is mounted a rectangular box member composed of a pair of side plates 16 and 17, which are flanged over at 16A and 17A at the bottom (Figure 2) so as to provide a suitable point of attachment to the frame members 10—10. The vertical rectangular box is closed on each side by the plate members 18 and 19 which are likewise suitably flanged at 18A and 19A (Figure 3) for attachment to the side plates 16 and 17 of the container. The members 16, 17, 18 and 19 form a box in which the knife-drum 50 revolves.

Figure 1:
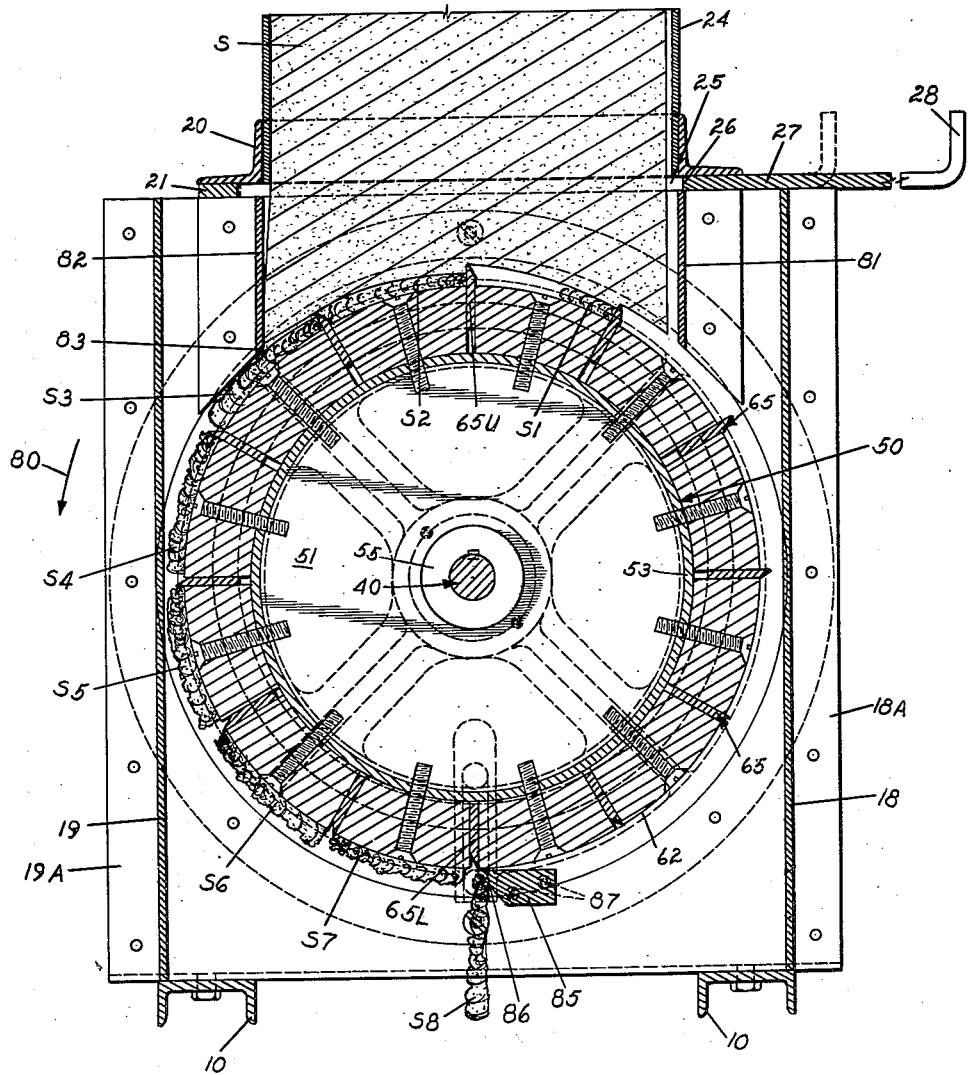
Figure 2:
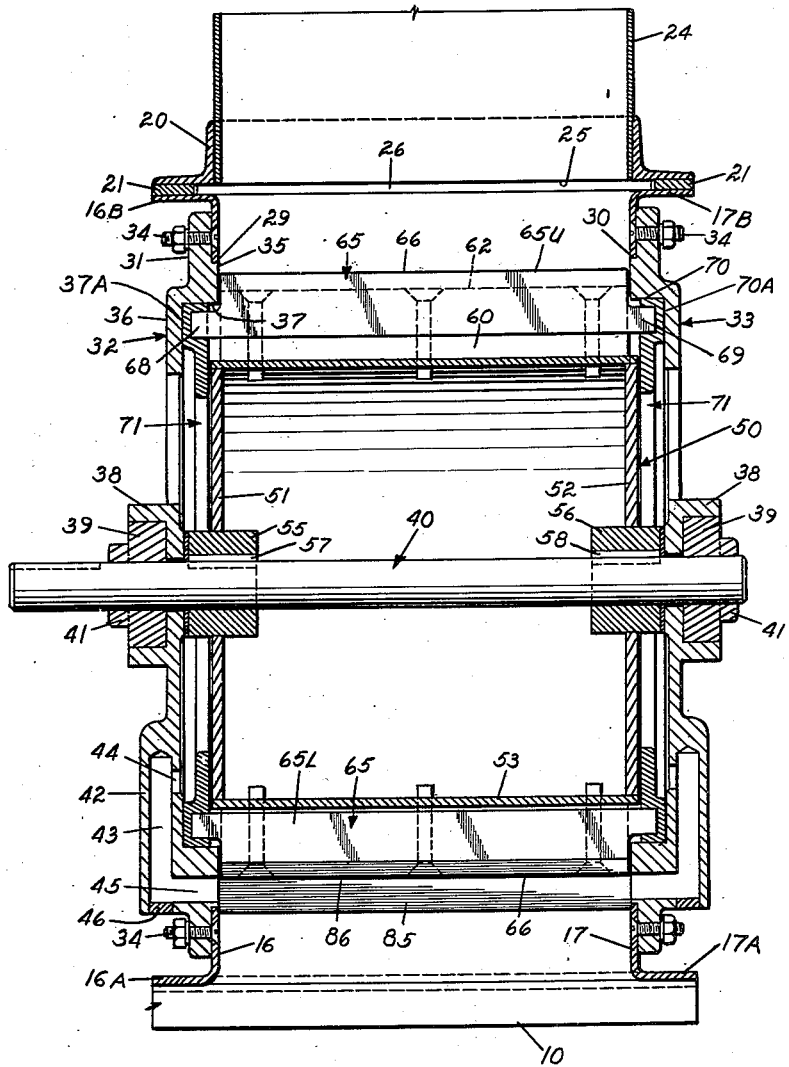
Figure 2 is another vertical view, partly in section, taken along the section line and taken in the direction of arrows 2—2 of Figure 3.

The box side members 16 and 17 are flanged over at 16B and 17B, as shown in Figure 2, and upon these flanges there is mounted a rectangular angle iron frame 20, which is spaced from flanges 16B—17B by the filler strips 21 (Figure 2). The rectangular angle frame 20 serves as a mounting for the inlet chute 24 of the same dimentional plan as the frame 20. In this instance the chute is shown as square, see Figure 3, but it is to be understood that the cross sectional plan may be either square or rectangular, depending upon the cross section of the blocks of shortening that are utilized in the apparatus. The spacing of the flanges 16B—17B from the rectangular frame 20 provides a slot space 25 in which there is positioned a slide 26 having an aperture 27 therein which is somewhat larger than the cross-sectional area of the chute 24. The slide 26 has a length projecting out at the right of Figure 1 somewhat greater than the width of the chute 24 and is provided at its outer end with a turned up handle 28 so that by moving the slide 27 to the left, as shown in Figure 1, the solid portion thereof can be brought into registry with the cross-sectional area of the chute 24, thus providing a firm base upon which the shortening may be stacked in the chute 24. It is to be understood that the chute 24 may project well above the machine so as to receive a series of cubes or other rectangular shapes of shortening within the chute itself preparatory to rapid delivery to the reducing mechanism herein described. When it is desired to move the shortening downward against the reducing mechanism and into the batch, the slide 27 is moved to the position shown in Figure 1, whereupon the solid shortening drops downwardly.

The side wall members 16 and 17 of the frame are each provided with a circular aperture indicated at 29 for side wall 16 and 30 for side wall 17. These apertures serve to locate cast side plates generally designated 32 and 33. These are substantially identical in configuration and hence only one need be described in detail.

Referring to side plate 32 it will be observed that it includes a flange 31 which seats upon the marginal edge of the box frame members 16 and is attached thereto by means of the bolts 34. The side plate 32 has an inwardly projecting flange 35 of a length sufficient to bring the interior surface of the side plate 32 even with the interior surface of the side wall 16. The side plate then extending downward also extends outward at the portion 36 and is machined out at 37 to provide a circular recess which is machined slightly eccentric in respect to the axis of the shaft generally designated 40. The shaft 40 is supported upon a central bearing boss 38, the latter being provided with a suitable anti-friction bearing 39, the bearings 39 being held in place by means of collars 41 on the shaft 40. At the lower portion of each of the side plates 32 and 33 there are protuberances as at 42 for plate 32 having an aperture 43 therein, ported at 44 to the interior of the plate and hence to the interior of the machine. The aperture 43 extends downwardly and has a side bore at 45, likewise extending to the interior of the machine below the rotating cylinder thereof. It will be noted that the bore 43 is plugged at 46. These passages through side plates 32 and 33 permit any shortening which may work into the space between the drum 50 and the plates 32 and 33 to drain downwardly when the apparatus is cleaned with steam.

Upon the shaft 40 there is supported a rotor generally designated 50 and shown in detail in Figures 4 and 5. The rotor has solid end plates 51 and 52 which are welded or otherwise firmly attached to the concentric cylindrical outer metallic shell 53. At the centers of the end plates 51 and 52 there are heavy bosses 55 and 56, respectively, which have keyways at 57 and 58. The bosses are bored concentrically with the surface of the outer metallic shell 53. The rotor structure is mounted upon the shaft 40 and is keyed thereto. The shaft 40 is coupled to the shaft 13 of the gear-reducer mechanism 15 and hence as the shaft 40 is rotated, the cylinder also rotates.

Upon the cylindrical shell 53 of the cylinder 50 there are mounted a plurality of segmental blocks 60, each block being attached to the cylinder by a plurality of flat-headed screws. Any desired number of blocks may be used around the periphery of the cylinder, there being twelve blocks illustrated in the instant machine, although it will be understood that a greater or lesser number may be used, if desired. The blocks 60 have a pattern in cross section such that they provide parallel wall spaces 61 between adjacent blocks. It will be noted that the blocks have a length axially in respect to the cylinder which is slightly less than the spacing distance between the parallel surfaces 35 of the end castings 32 and 33. It is only necessary that mechanical clearance be allowed between the ends of the blocks and the inside surfaces of the end plates 32 and 33.

The block 60 may be composed of any suitable material, wood or metal. In the illustrated embodiment of the invention, the blocks are made of hard maple and after they are attached to the cylindrical shell 53 of the cylinder mechanism 50, it is preferable that the entire cylinder be trued up in a lathe so as to provide a smooth concentric outer cylindrical surface on the cylinder-block assembly.

Into the spaces 61—61 provided between the blocks 60 there are positioned knives of the pattern shown in Figures 6 and 7. The knives, generally designated 65, have a width W such that when the knife 65 is entirely retracted into the space 61, the sharpened edge 66 of the knife will be just below the surface 62 of the blocks 60. The length L of the knives 65 is the same as the length dimension L of the block 60. Protruding at opposite ends of the knife are ears 68 and 69; these ears having surfaces which are slightly rounded to provide a good bearing surface.

Figure 8:
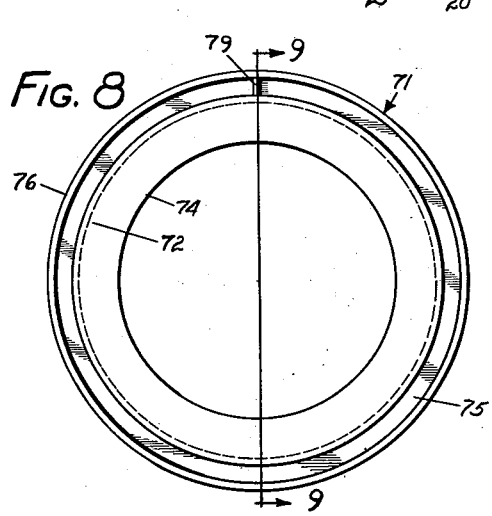
Figure 8 is a side elevational view of one of the knife control rings of the apparatus shown separated from the remainder of the apparatus.
Figure 9:
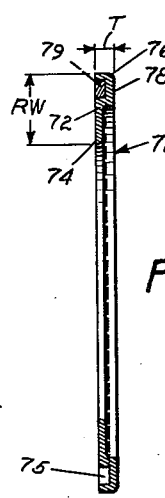
Figure 9 is a sectional view taken along the line and in the direction of the arrows 9—9 of Figure 8 of the knife control ring of the apparatus.

Into the eccentrically machined recesses 37 and 70 of the end plates 32 and 33 there are inserted knife control rings generally designated 71 and shown in detail in Figures 8 and 9. The knife control rings are preferably of good bearing material, such as bronze, and have a surface 72 which operates in contact with the outer surfaces of the end plates 51 and 52 of the drum, as shown in Figure 2. The radial width RW of the knife control ring 71 is such that at least some part of the flange 74 always rides in contact with the outer surface of the end plates 51 or 52 of the drum 50, Figure 2. At its periphery the knife control ring 71 is thickened and in this portion there is machined a groove 75 having a radial width to receive the end lugs 68 and 69 of the knives 65. The radial width of the slot 75 is the same as the spacing between surfaces 70—70 of the knives, plus bearing clearance. The groove 75 is concentric with the outer surface 76 of the ring. The diameter of the rings 71 measured at the outer surface 76 is such that they will rotate freely within the recesses 37 and 70 of the end plates 32 and 33, only sufficient clearance being allowed so that the rotation is a free journal rotation without binding and sticking. The thickened outer portion of the ring has a back bearing surface 78 which bears against the bottom 37A or 70A, respectively, of the eccentric recesses within the side plates 32 and 33.

The knives are assembled into the rotor and their end portions 68 and 69 are inserted into the grooves 75 of the knife control rings 71, as shown in Figure 2. Each of the rings 71 of the apparatus, as shown in Figure 2, is provided with one stop web at 79, as shown in Figure 8. The eccentricity of the recesses 37 and 70 of the side plates 32—33 is sufficient so that when any blade is in its lowermost position, illustrated for the blade 65L of Figure 2, the cutting edges 66 of the blades will be retracted to just below the surface 62 of the rotor and when the same blade is brought up to the uppermost position shown for the blade 65U of Figure 2, the cutting edge of the blade is projected out to a prescribed amount, preferably approximately ¼ to ⅜ inch. The eccentricity of the axis of rotation of rings 71 is, therefore, toward the feed chute 24 and is equal to the radial movement of the blade from the position 65L to 65U which is preferably ¼ to ⅜ inch, although it may be more or less than these amounts.

One of the blades of the unit serves to engage the web 79 of each ring and accordingly both knife control rings 71—71 at opposite ends of the cylinder are caused to rotate within the recesses 37 or 70, as the case may be. The rings, being rotated about their axis which is eccentric in respect to the shaft 40, serve to move the knife blades from their position of maximum projection, shown for the blade 65U in Figures 1 and 2, to the position of negative projection (retraction) shown for the blade 65L of Figures 1 and 2. The rotation of the rotor shown in Figure 1 is in the direction of arrow 80 and as each blade moves from the position 65U in the direction of arrow 80 to the position shown for blade 65L, the blade is gradually retracted. The block of shortening S, or more properly the column of blocks of shortening, in the chute 24 bear down upon the top of the rotor 50 and as the rotor turns each of the knives 65, being projected outwardly (where in contact with the lower surface of the shortening mass) serves to scrape off some of the shortening, thus forming separated portions of shortening indicated at S1, S2 and S3. Below the level of the slide 27 and between the frame members 16 and 17 there are provided a pair of shortening stabilizer plates 81 and 82 which serve to define the downward course of the shortening below the lower end of the chute 24. The lower portion 83 of the inner wall 82 serves as a bite to support the shortening as it is cut off by the knives as they proceed past this part of the wall and the cut off masses of shortening S4, S5, S6 and S7 adhere more or less to the outer surface 62 of the blocks between each knife because the shortening is adhesive as well as plastic. As the rotation continues downwardly the knives 65 are gradually retracted, as shown for the left portion of Figure 1, from the uppermost knife 65U to the lowermost knife 65L.

Adjacent the lower vertical center line of the rotor there is provided a cut-off blade 85 adjustably supported on screws 87 from plates 16 and 17 of the apparatus. The cut-off knife is adjusted vertically so that it just clears the surface 62 of the rotating drum, it being noted that at the position of the cut-off knife 85 the blades 65 are retracted to a position below the level with the outer surface 62 of the rotor. The knife 85 is, of course, adjusted vertically so that it clears the outer sharpened edges of the rotating knives 65. Accordingly, as the rotation of rotor 50 continues the portions S1—S7 of cut off shortening are brought into contact with the sharpened edge 86 of the cut-off knife and are peeled off, as shown for the portion S8 of the shortening. The portions S8 of the shortening, upon being loosened, fall directly downwardly between the frame members 18—19 and the side plates 16—17, Figures 1 and 2. One of the advantages of the invention is that the cut off portions of shortening S1—S8 are somewhat curled up in the cutting operation. In other words the shortening is sliced and worked somewhat by the machine and is simultaneously delivered at the delivery end of the machine in relatively small portions.

For best results the entire machine is mounted directly above the mixing apparatus where the shortening is incorporated with flour, sugar, salt, leavening agent, dried milk and other dry ingredients of the formula. The dry ingredients may be introduced in large masses or by a continuous delivery at a specified rate. In the more usual type of operation the batch method is used and the mixing apparatus is situated below the shortening reducing machine. Thus, in a batch which may have a total weight of 1500-2000 pounds, the dry ingredients are first brought into the mixing apparatus and mixed preliminarily. The slide 27 is in the meantime moved to the position to support the shortening and the requisite number of blocks of shortening are then introduced into the hopper or chute 24, which usually extends in the room of the factory to the floor above where the shortening is stored under refrigerated conditions. The required amount of shortening is then introduced into the chute 24 or prepared for quick introduction into the chute. The slide 27 is then opened and the motor 14 started, whereupon the rotor 50 very quickly cuts the shortening into relatively small portions S1—S8 by the action previously described, delivering these directly into the dry ingredients awaiting in the mixer below the machine. It is preferable to operate the mixing machine as the shortening is delivered, thus completely dredging the shortening in dry ingredients as the particles of shortening are dropped downwardly into the dry ingredient mass. In this way the mixing operation can be accomplished very expeditiously. By utilizing this invention a 1000–1500 pound batch can be mixed and the shortening uniformly cut in, in 27 to 45 seconds. It has been found that by using this invention the mixing (cutting) of the shortening is very thorough, the shortening being cut into the dry ingredients uniformly throughout the mass, there being only 1% to 2% of shortening which is discernible in particle size larger than 2 ounces. Far superior results are thus obtainable by utilizing the shortening cutter of the instant invention for large scale commercial operation and preparation of prepared (packaged) baking mixes of various sorts.

A special feature of the invention is its sanitary construction. The entire device can be steamed out and all shortening melted and drained without dismantling the apparatus.

As many apparently widely different embodiments of this invention may be made without departing from the spirit and scope thereof, it is to be understood that I do not limit myself to the specific embodiments herein. The rings 71 may be mounted upon an eccentric axis as previously described, but made non-rotatable with reference to end plates 32 and 33, and the webs 79 of each ring removed. In such case the lugs 68—69 of the knives 65 merely slide around in grooves 75 of the rings 71, which being eccentric in respect to the axis of drum 50 cause the blades to be projected and retracted as previously described. In such case the bearing action is between the lugs 68—69 and the groove 75 of rings 71 rather than between the rings 71 and their seating recesses in end plates 32—33.

What I claim is:

1. A shortening cutter comprising an upright chute for receiving large masses of solid plastic shortening, said chute terminating at a cylinder, means, including side frames, mounting said cylinder for rotation about a substantially horizontal axis, a plurality of blades mounted on said cylinder for movement inwardly and outwardly in a substantially radial direction relative to said cylinder, a ring of bearing material adjacent each end of the cylinder removably mounted to rotate in said side frames, means to rotate said rings, each ring having a groove therein providing a bearing surface, projections on said blades engaging said grooves on said rings, said rings being mounted about an eccentric axis of rotation parallel to said cylinder axis with the axis of eccentricity above the axis of rotation of said cylinder for moving the blades to a condition of maximum projection when they are adjacent the upper course of travel of said cylinder to a condition of retraction when the blades are near the lower course of travel of said cylinder and a scraper blade mounted near the lower course of travel of said cylinder, said scraper blade being parallel to and closely adjacent the surface of said cylinder.

2. A shortening cutter comprising an upright chute for receiving large masses of solid plastic shortening, said chute terminating at a cylinder, means mounting said cylinder for rotation about a substantially horizontal axis, a plurality of blades mounted on said cylinder for movement inwardly and outwardly in a substantially radial direction relative to said cylinder, a ring adjacent each end of the cylinder, each ring having a groove therein, projections on said blades engaging said grooves on said rings, said rings being mounted about an eccentric axis of rotation parallel to said cylinder axis with the axis of eccentricity above the axis of rotation of said cylinder for moving the blades to a condition of maximum projection when they are adjacent the upper course of travel of said cylinder to a condition of retraction when the blades are near the lower course of travel of said cylinder, a stop being provided in the groove of each ring to be engaged by the projections on one blade, said rings being mounted for rotation about their eccentric axis, and a scraper blade mounted near the lower course of travel of said cylinder, said scraper blade being parallel to and closely adjacent the surface of said cylinder.

3. A shortening cutter for reducing relatively large masses of solid plastic shortening into relatively smaller particles thereof preparatory to mixing said particles of shortening with dry ingredients in the preparation of ready prepared baking mixtures comprising a frame, a cylinder mounted on said frame for rotation about a substantially horizontal axis, said cylinder having slots in the surface thereof extending substantially axially of the cylinder and substantially radially thereof, a plurality of substantially identical blades positioned in said slots for movement radially inwardly and outwardly relative to the surface of the cylinder, a ring mounted at the end of each cylinder, each said ring having a groove therein and each blade being formed with projections, one projection extending into the groove of each of said rings, said rings being mounted eccentrically with respect to the axis of rotation of the cylinder with the axis of the eccentrically mounted rings above the axis of rotation of said cylinder for moving the blades inwardly and outwardly as the cylinder rotates them from a condition of maximum projection at the upper course of travel of the blades rotating with said cylinder to a condition of retraction below the surface of the cylinder where the blades rotate with the cylinder at the lower course of travel thereof, said eccentrically mounted rings being mounted for rotation and the groove therein being provided with a protuberance for engagement by the projections on one of the blades for causing rotation of said rings, and a chute above said cylinder, said chute being positioned symmetrically with reference to the length and axis of rotation of the cylinder, one dimension of said chute being less than the diameter of said cylinder and the other dimension of the chute being substantially the same as the length of the blades on said cylinder, and a scraper blade adjacent the lower course of travel of the blades on said cylinder, said scraper blade being mounted substantially parallel to the axis of rotation of said cylinder and closely adjacent the surface thereof.

4. A shortening cutter for reducing relatively large masses of solid plastic shortening into relatively smaller particles thereof preparatory to mixing said particles of shortening with dry ingredients in the preparation of ready prepared baking mixtures comprising a frame, a cylinder mounted on said frame for rotation about a substantially horizontal axis, said cylinder having slots in the surface thereof extending substantially axially of the cylinder and substantially radially thereof, a plurality of substantially identical blades positioned in said slots for movement radially inwardly and outwardly relative to the surface of the cylinder, a ring mounted at the end of each cylinder, each said ring having a groove therein and each blade being formed with projections, one projection extending into the groove of each of said rings, said rings being mounted eccentrically with respect to the axis of rotation of the cylinder with the axis of the eccentrically mounted rings above the axis of rotation of said cylinder for moving the blades inwardly and outwardly as the cylinder rotates them from a condition of maximum projection at the upper course of travel of the blades rotating with said cylinder to a condition of retraction below the surface of the cylinder where the blades rotate with the cylinder at the lower course of travel thereof, said eccentrically mounted rings being mounted for rotation and the groove therein being provided with a protuberance for engagement by the projections on one of the blades for causing rotation of said rings, and a chute above said cylinder, said chute being positioned symmetrically with reference to the length and axis of rotation of the cylinder, one dimension of said chute being less than the diameter of said cylinder and the other dimension of the chute being substantially the same as the length of the blades on said cylinder, and a scraper blade adjacent the lower course of travel of the blades on said cylinder, said scraper blade being mounted substantially parallel to the axis of rotation of said cylinder and closely adjacent the surface thereof, vertically adjustable with reference to the surface of the cylinder.

CHARLES A. LANG.

REFERENCES CITED

The following references are of record in the file of this patent:

UNITED STATES PATENTS

| Number | Name | Date |
|---|---|---|
| 383,438 | Clare | May 29, 1888 |
| 536,047 | Schmack | Mar. 19, 1895 |
| 1,619,550 | Thebaud et al. | Mar. 1, 1927 |

FOREIGN PATENTS

| Number | Country | Date |
|---|---|---|
| 323,410 | France | Nov. 7, 1902 |
| 352,074 | France | May 22, 1905 |